United States Patent [19]

Ferris et al.

[11] Patent Number: 5,070,917
[45] Date of Patent: Dec. 10, 1991

[54] PRESSURIZED FLUID-DRIVABLE DEVICE FOR INJECTING A TREATMENT LIQUID STORED THEREIN INTO A TIRE OR OTHER ENCLOSED SPACE

[76] Inventors: James E. Ferris, 15 High Mesa Pl., Richardson, Tex. 75080; William J. Quest, 5609 Ursula La., Dallas, Tex. 75229

[21] Appl. No.: 490,137

[22] Filed: Mar. 7, 1990

Related U.S. Application Data

[63] Continuation-in-part of Ser. No. 366,673, Jun. 14, 1989.

[51] Int. Cl.⁵ .................... B65B 31/00; G01F 11/00
[52] U.S. Cl. ................................. 141/38; 222/389; 152/415
[58] Field of Search ................... 141/37, 38, 98; 137/223, 231; 81/15.2, 15.5; 106/33; 73/146, 146.8; 152/415, 416, 417; 222/406, 389

[56] References Cited

U.S. PATENT DOCUMENTS

| | | | |
|---|---|---|---|
| 1,140,177 | 5/1915 | McCauley | 222/389 |
| 2,679,654 | 6/1954 | Hosking | 152/415 |
| 2,689,675 | 9/1954 | Stirrup | 222/389 |
| 2,767,796 | 10/1956 | Roberts | 222/389 |
| 3,043,348 | 7/1962 | Wellsch | 141/38 |
| 3,367,545 | 2/1968 | Cook | 222/389 |
| 3,795,262 | 3/1974 | Post | 141/1 |
| 3,921,858 | 11/1975 | Bemm | 222/389 |
| 4,398,574 | 8/1983 | Moore | 141/1 |
| 4,555,295 | 11/1985 | Orikasa et al. | 141/1 |
| 4,612,798 | 9/1986 | Roberts | 141/4 |
| 4,653,550 | 3/1987 | Crowley | 137/223 |
| 4,765,367 | 8/1988 | Scott | 141/38 |
| 4,798,233 | 1/1989 | Mooney | 141/38 |

FOREIGN PATENT DOCUMENTS

854744 11/1960 United Kingdom .................. 141/38

Primary Examiner—Charles E. Phillips
Assistant Examiner—Keith Kupferschmid
Attorney, Agent, or Firm—Hubbard, Thurman, Tucker & Harris

[57] ABSTRACT

A compact device for sealingly storing, and subsequently delivering to the interior of a tire, a predetermined charge quantity of a tire leak sealant liquid includes a hollow liquid storage and transfer member, having an inlet fitting and an outlet fitting, within which the sealant liquid is disposed. When the hollow member is operatively interconnected between a pressurized air source and the tire's valve stem, pressurized air sequentially forces the entire sealant liquid charge volume into the tire and then flows into the tire through the storage and transfer member. Accordingly, the device may be utilized to repair and fully inflate a flat tire. A check valve structure incorporated in the device prevents fluid backflow through the storage and transfer member. The device may also be used to force other treatment liquids, such as a tire conditioner liquid, into the tire. In an alternate embodiment of the device, the storage and transfer member is filled with a refrigerant circuit treatment liquid and may be interconnected between a source of pressurized refrigerant and a refrigerant circuit fill valve to recharge the circuit and force the treatment liquid thereinto.

12 Claims, 3 Drawing Sheets

PRESSURIZED FLUID-DRIVABLE DEVICE FOR INJECTING A TREATMENT LIQUID STORED THEREIN INTO A TIRE OR OTHER ENCLOSED SPACE

CROSS REFERENCE TO RELATED APPLICATION

This application is a continuation-in-part of U.S. application Ser. No. 366,673 filed on June 14, 1989.

BACKGROUND OF THE INVENTION

The present invention relates generally to apparatus for flowing fluids into enclosed spaces such as tire interiors. In a preferred embodiment thereof, the present invention more particularly provides a compact, flow through device which sealingly stores a predetermined charge quantity of a liquid, such as a tire sealant liquid or a tire conditioner liquid, and may be subsequently interconnected between the valve stem of a tire, and a source of pressurized air, to efficiently force the entire volume of stored liquid into the interior of the tire as the air continues to inflate the tire.

Various types of aerosol can devices containing a tire sealant liquid are now available to motorists for use in the emergency roadside repair of flat tires. In the typical scenario, the aerosol can is purchased and kept in the vehicle for subsequent use in the event that one of its tires goes flat. When a flat occurs, an outlet fitting on the can may be connected to the flat tire's valve stem to intercommunicate the interiors of the tire and can.

The theory behind this now common aerosol tire repair device is that such intercommunication will force the aerosol propellant into the tire to re-inflate it, and the sealant liquid will be carried into the tire, by the inrushing propellant, to internally seal its puncture or leak. Despite the apparent logic in this theory, in actual practice conventional aerosol tire sealant devices of this general type are commonly subject to a variety of well known problems, limitations and disadvantages.

For example, due to the relatively small volume of these aerosol cans (typically sold in a 16 ounce size) in comparison to the much larger internal volume of the normal automotive vehicle tire, they simply cannot fully re-inflate a flat tire on a car or truck. Typically, they can re-inflate such a tire only to about one third of its normal operating pressure (i.e., to a reinflated pressure of approximately 10 psi.). The result is a grossly underinflated tire which, if driven on for any appreciable distance, can be severely damaged due to such unavoidable underinflation.

The volume disparity between the can and tire also, as a practical matter, limits the use of the can to emergency situations in which the tire is completely flat. Attempts to use the can with a fully inflated tire (i.e., to pre-seal the tire interior), or a tire with a slow leak therein, are normally futile since the can and tire pressures will quickly equalize before much of the sealant can be forced into the tire.

Another problem associated with conventional aerosol tire sealant cans of this type is that it is difficult, if not impossible, to force all of the sealant liquid into the tire due to the relatively high viscosity and volumetric weight of the sealant liquid typically used. What normally happens (particularly if the can is not well shaken before and during use) is that all of the aerosol propellant is discharged from the can before all of the sealant is, thereby often leaving a major portion of the sealant in the otherwise evacuated can.

The outlet of the typical aerosol sealant can is normally provided with a connection fitting which may be threadingly secured to the valve stem. This connection fitting is designed to simultaneously do two things as it is being secured to the valve stem - depress the tire valve closure pin within the valve stem, and open the can's discharge passage for propellant and sealant outflow therethrough into the opened tire valve. It is a common occurrence, however, for the can's discharge passage to be opened before the tire valve is opened. This often results in a messy "sprayback" of sealant onto the user and/or the exterior of the tire being repaired.

A positional problem is also associated with many conventional aerosol sealant cans in that they must be used in an inverted position—i.e., with the can body being disposed generally above the outlet of the can. Because of potential interference between the inverted can body and the wheel well portion of the car or truck body, this typically and often inconveniently requires that the still-mounted flat tire be rotated until its valve stem is positioned on a lower portion thereof.

From an environmental standpoint, aerosol tire sealant cans of this type are, of course, also undesirable. At some point in time the aerosol propellant delivered into the tire interior will be freed to further damage the environment. Furthermore, as is well known, the typical aerosol propellant is highly flammable, thereby creating a potential fire hazard if appropriate care is not taken during its use.

Finally, for a rather interesting psychological purpose, a substantial quantity of water is typically placed in the cans along with the sealant and propellant therein. The purpose of this water addition is simply to add weight to the overall device so that a consumer, when picking the can up in a store, will not think the can is too light (and therefore empty) and place it back on the shelf. The added water serves no other useful purpose.

At least part of this water is ultimately injected into the interior of the tire being repaired, thereby undesirably creating several potential problems. For example, the injected water can cause deterioration of the interior surface of the tire, and can accelerate rusting of the metal wheel rim. Additionally, during cold weather the injected water can freeze, thereby creating tire imbalance.

At least some of these problems also exist in other applications in which it is necessary to force a treatment liquid into an enclosed space through an inlet valve operatively associated therewith - for example, the injection into an air conditioning system refrigerant circuit of a leak inhibiting liquid.

From the foregoing it can readily be seen that a need exists for improved apparatus for injecting sealant or other treatment liquid into the interior of a tire or other enclosed space. It is accordingly an object of the present invention to provide such improved apparatus.

SUMMARY OF THE INVENTION

In carrying out principles of the present invention, in accordance with a preferred embodiment thereof, a compact, easy to use, and quite inexpensive flow through device is provided for sealingly storing, and later delivering into the interior of a tire, a selected tire treatment liquid such as a tire leak sealant or a tire conditioning liquid as the air continues to inflate the tire. To use the device it is simply interconnected between the valve stem of the tire and a source of pressurized air. Pressurized air inflow to the device efficiently drives the entire quantity of the liquid previously stored therein into the tire in a manner providing significant improvements and advantages over aerosol can devices conventionally used to inject tire sealant liquid into tires.

The device, in preferred embodiments thereof, includes a hollow liquid storage and transfer member within which a predetermined charge volume of tire sealant liquid is disposed, the member having first and second opposite open ends. An inlet fitting structure, having an inlet opening communicating with the interior of the member, is secured to the first end of the member and is connectable to a source of pressurized air to flow the air through the inlet opening into the interior of the member. A discharge fitting structure, having an outlet opening communicating with the interior of the storage and transfer member, is secured to the second member end and is threadably securable to the valve stem of the tire to permit fluid inflow to the tire interior from the interior of the member. A pin member carried by the discharge fitting structure functions to depress the valve opening pin within the tire valve stem when the discharge fitting structure is operatively secured to the valve stem.

Prior to the use of the device, the tire sealant (or other liquid) disposed within its storage and transfer member is sealed therein by closure caps removably secured to the inlet and discharge fitting structures over their inlet and outlet openings, and the compact device may be conveniently stored in the glove compartment or trunk of the vehicle. In another version of the device, the inlet and discharge fittings are configured so that these closure caps need not be used.

When it becomes necessary to use the device, for example in the roadside repair of a flat tire, the discharge fitting structure is operatively connected to the valve stem of the flat tire, and the inlet fitting structure is operatively connected to the outlet fitting of a suitable source of pressurized air. A particularly convenient pressurized air source in this application is a small, commercially available, electrically driven tire inflation air pump of the type which may be stowed in the vehicle and simply plugged into its cigarette lighter when use of the pump becomes necessary. Alternately, an ordinary foot or handoperated air pump may be used as the pressurized air source or, if available, the compressed air hose at a service station may be used.

With the device operatively interconnected between the valve stem and the air source, pressurized air inflow to the storage and transfer member efficiently and completely drives the entire charge volume of the liquid into the tire interior - an event which can be visually verified by the user of the device simply by forming the storage and transfer member from a transparent material such as plastic. Tire pressure-driven reverse fluid flow through the storage and transfer member (which, in some instances, might undesirably drive some of the sealant liquid into the air source pumping structure) is conveniently precluded by suitable check valve means incorporated in at least one of the inlet and outlet fitting structures.

The use of pressurized air from one of the representative sources thereof listed above eliminates most, if not all of the problems of conventional aerosol can devices used to perform this flat-fixing problem. For example, there is no deleterious aerosol/fluorocarbon release to atmosphere, no water need be forced into the tire, and liquid "sprayback" problems may be eliminated simply by fully connecting the discharge fitting structure of the device to the tire valve before initiating pressurized air flow through the storage and delivery tube. Additionally, since pressurized air is used as the propellant, the potential fire hazard associated with flammable aerosol propellants is eliminated.

As previously mentioned, the use of pressurized air (from a pump-based source thereof) assures complete delivery of the entire liquid volume to the tire interior. Also, the tire volume-to-propellant volume disparity problem associated with aerosol can devices is totally eliminated. Specifically, the device of the present invention may be used not only to seal and fully inflate a fully flat tire, but may also be used to inject sealant (or other) liquid into a fully inflated, non-leaking tire (as a leakage preventive measure), or inject such liquid into a nearly fully inflated, but slowly leaking, tire to prevent it from going flat.

While the device of the present invention is particularly useful in injecting a tire treatment liquid, and subsequent pressurized air, into a tire, it is also quite useful in other applications in which it is necessary or desirable to inject a treatment liquid into an enclosed space through a normally closed inlet valve operatively associated therewith.

For example, in one representatively illustrated embodiment of the device the storage and transfer member is filled with a charge volume of refrigerant circuit leak inhibiting liquid, and the inlet and outlet fittings are configured for respective connection to a source of pressurized refrigerant fluid and the fill valve on an automotive air conditioning system refrigerant circuit. By operatively interconnecting the device between the refrigerant source and the fill valve, the leak inhibiting liquid, and a subsequent volume of pressurized refrigerant, may be conveniently forced into the circuit to recharge it (either partially or fully) and stop leaks therein.

DETAILED DESCRIPTION

Figures 1, 2:
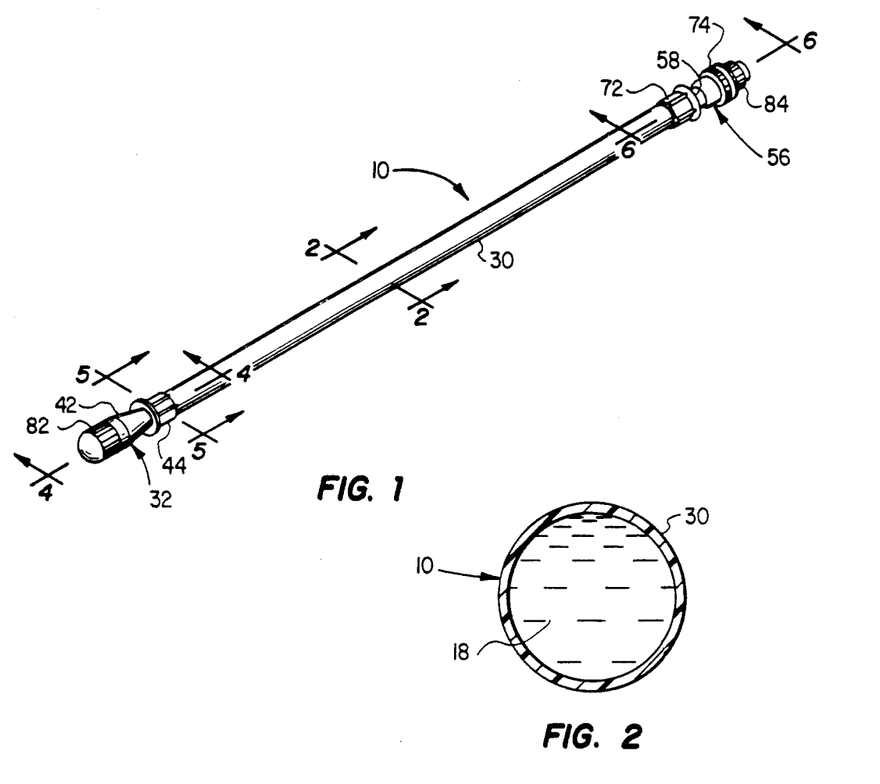
FIG. 1 is a perspective view of a device which embodies principles of the present invention and is used to sealingly store a predetermined volume of tire treatment liquid, such as sealant liquid or conditioner liquid, that may be subsequently forced into the interior of a tire through its valve stem by operatively interconnecting the device between the valve stem and a source of pressurized air.
FIG. 2 is an enlarged scale cross-sectional view through a liquid storage and transfer tube portion of the device taken along line 2—2 of FIG. 1.
Figure 3:
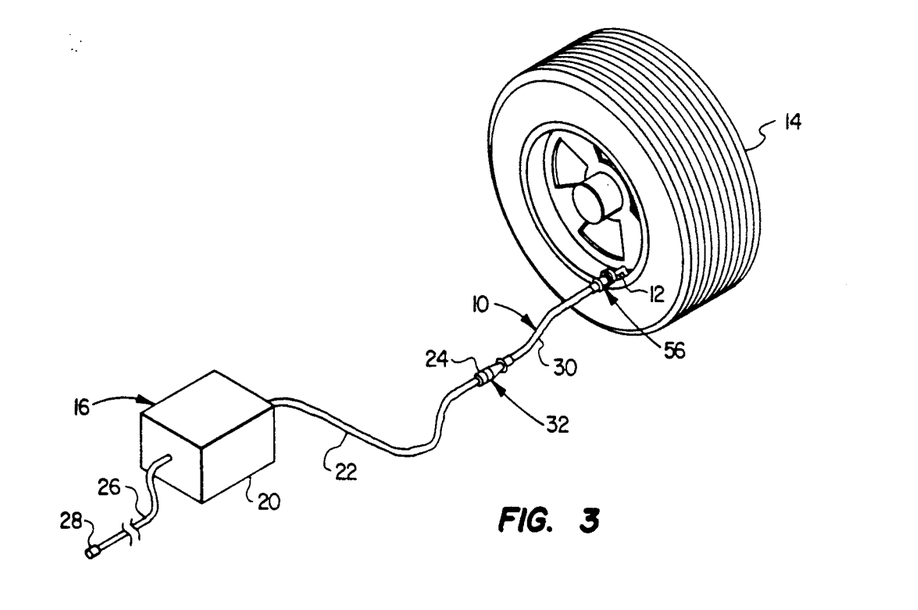
FIG. 3 is a reduced scale, partially schematic perspective view of the device operatively interconnected between the valve stem of a tire and an electrically operated tire inflation pump.

Illustrated in FIGS. 1–3 is a device 10 which embodies principles of the present invention and is interconnectable between the externally threaded valve stem 12 of a car or truck tire 14, and a source 16 of pressurized air, to inject a tire treatment liquid (such as the illustrated tire sealant liquid 18), previously stored within the device, into the tire through its valve stem. The pressurized air source 16, as schematically and representatively depicted in FIG. 3, may conveniently be a small, electrically driven tire inflation air pump 20 of a commercially available type which is stowable in the glove compartment or trunk of the vehicle.

In a conventional fashion, the pump 20 has a pressurized air discharge hose 22, with a suitable connection fitting 24 on its outer end, and an electrical supply cord 26 with a plug member 28 positioned at its outer end and insertable into the cigarette lighter of the vehicle. Other conventional types of pressurized air sources, such as hand or foot-operated air pumps, or the typical compressed air hose at a service station, may be alternately used if desired.

The device 10 includes a hollow liquid storage and transfer member in the form of a relatively short length of flexible, and preferably transparent plastic tubing 30 within which a predetermined charge volume of the liquid 18 is stored prior to its air-powered delivery into the tire 14.

Secured to the left end of the tube 30 (see FIG. 4) is a pressurized air inlet fitting structure 32 having an inlet opening 34 which communicates with the interior of the tube 30 and is adapted to receive pressurized air 36 from the pump 20 when the device 10 is being used. The inlet opening 34 extends axially through an externally threaded hollow cylindrical insert member 38 having a radially inwardly projecting, annular longitudinally central portion which, for purposes later described, defines a valve seat 40. A right end of the insert member 38 is threaded into a left end portion of an elongated, generally tubular support member 42 having a rightwardly and radially inwardly tapered longitudinally intermediate portion $42_a$, and a reduced diameter right or inner end portion $42_c$. As illustrated, a left end portion of the insert member projects outwardly beyond the left end of the support member 42.

Figure 4:
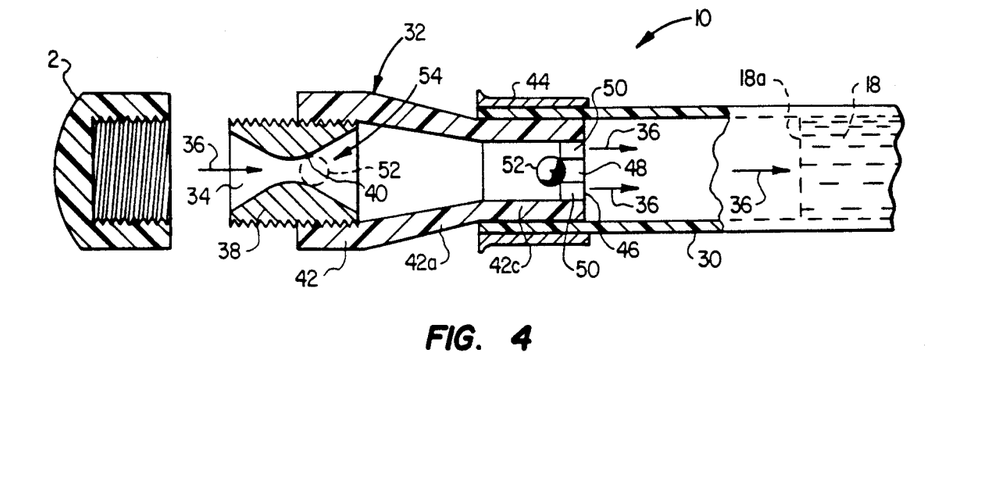
FIG. 4 is an enlarged scale, partially exploded cross-sectional view, partly in elevation, through a pressurized air inlet end portion of the device taken along line 4—4 of FIG. 1.
Figure 5:
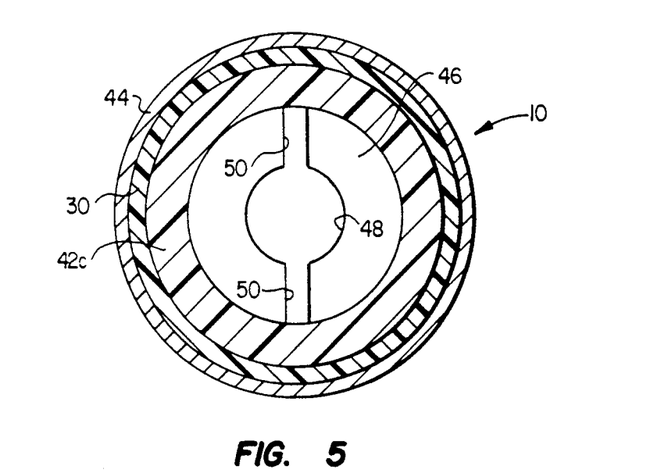
FIG. 5 is an enlarged scale cross-sectional view through the pressurized air inlet end portion taken along line 5—5 of FIG. 1.

Referring now to FIGS. 4 and 5, the smaller diameter right end portion $42_c$ of the support member 42 is closely received within the left end of the tube 30 and is firmly secured thereto by an annular crimp fitting 44 which outwardly circumscribes a left end portion of the tube 30 and tightly presses it against the external side surface of the support member end portion $42_c$. Extending across the right end of the support member 42 is a circular end wall 46 having formed therethrough a circular opening 48, from the periphery of which a diametrically opposed pair of radial slots 50 outwardly extend.

A small valve ball member 52 is captively retained within the interior of the support member 42 between the insert member 38 and the support member end wall 46. For purposes later described, the ball 52 defines with the valve seat 40 a check valve structure 54 within the inlet fitting structure 32. As illustrated in FIG. 4, the ball 52 has a rightward limit position in which the ball seats in the circular end wall opening 48, and a leftward limit position (shown in dotted lines in FIG. 4) in which the ball 52 is operatively positioned against the valve seat 40 to preclude leftward fluid flow through the inlet opening 34.

Figure 6:
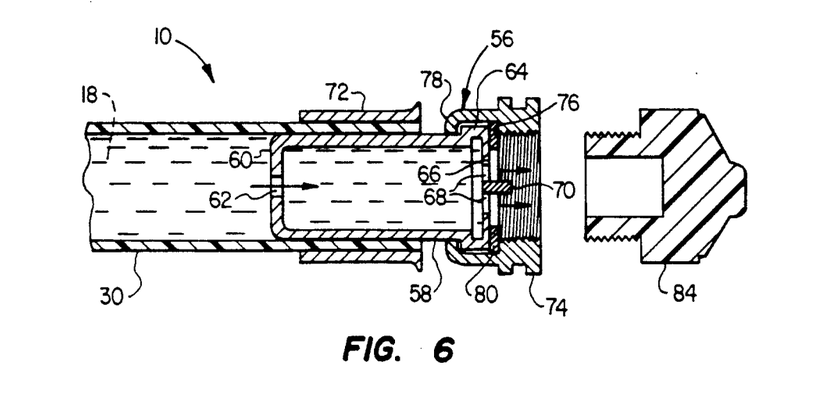
FIG. 6 is an enlarged scale cross-sectional view through a liquid discharge end portion of the device taken along line 6—6 of FIG. 1.

Secured to the right end of the tube 30 is a discharge fitting structure 56 which includes a hollow, generally cylindrical insert member 58 having a left end wall 60 with a central opening 62 formed therein, and a radially enlarged right end portion 64. A right end wall 66 of the insert member 58 has a spaced pair of openings 68 formed therethrough and positioned on opposite sides of a pin member 70 which projects axially outwardly from the end wall 66.

As illustrated in FIG. 6, a left end portion of the insert member 58 extends into the right end of the tube 30 and is firmly secured thereto by an annular crimp fitting 72 which overlies the right end of tube 30 and presses it firmly against the outer side surface of the insert member 58. The enlarged right end portion 64 of the insert member 58 has rotatably mounted thereon an annular, internally threaded connection member 74 having a central internal annular ledge 76 and an inturned rear end wall portion 78. The enlarged right end portion 64 of the insert member 58 is captively retained between the ledge 68 and the inturned wall portion 78, and a resilient washer member 80 is operatively positioned between the insert member end wall 66 and the annular ledge 76.

Prior to use of the device 10 to inject the sealant liquid 18 into the tire 14, the liquid 18 is sealingly stored within the tube 30 by means of a removable closure cap 82 (FIG. 4) threaded onto a left end portion of the externally threaded insert member 38, and a removable closure cap 84 (FIG. 6) threaded into the internally threaded connection member 74. The device 10, in this liquid storage orientation, is conveniently stowable in the glove compartment or trunk of the vehicle, with the closure caps 82, 84 preventing the stored liquid 18 from leaking out of the tube 30, and protecting the liquid against deterioration.

To use the device 10 to forcibly inject the sealant fluid 18 into the tire 14, the closure caps 82, 84 are removed, the right end connection member 74 is threaded onto the externally threaded valve stem 12, and the connection fitting 24 of the pump discharge hose 22 is threaded onto the outwardly projecting left end portion of the insert member 38. The pump 20 is then energized to flow pressurized air 36 rightwardly through the inlet opening 34 of the device 10 as illustrated in FIG. 4. This inflow of pressurized air 36 moves the valve ball 52 to its solid line right limit position over the end wall opening 48 and flows rightwardly through the interior of the support member 42 and the slots 50 in the support member end wall 46 into the tube 30. The pressurized air 36 rightwardly entering the tube 30 forces the sealant liquid 18 rightwardly through the tube and outwardly through its right end via the openings 62 and 68 (FIG. 6) in the right insert member 58.

The pin member 70 projecting outwardly from the right insert member end wall 66 is operative, when the connection member 74 is threaded onto the valve stem 12, to depress the internal plunger pin (not shown) of the valve stem, thereby holding the tire valve open. Accordingly, the rightwardly moving sealant fluid 18 is driven, by the pressure of the incoming air 36, into the interior of the tire 14 through the opened valve stem. Because the tube 30 is transparent, the user of the device 10 can visually verify that the full charge of the previously stored sealant fluid 18 has been delivered to the interior of the tire 14 simply by watching the left end $18_a$ of the fluid column 18 (FIG. 4) as it moves rightwardly through the storage and transfer tube 30.

After the entire quantity of the sealant fluid 18 previously stored in the tube 30 is delivered into the interior of the tire 14, pressurized air flow through the tube may be maintained to fully inflate the tire in the event that it was previously flat. Accordingly, using the device 10, the tire 14 may be fully inflated from a flat condition while at the same time having any leaks or punctures therein sealed by the injected fluid 18. Due to the use of the pump-based pressurized air source 16, the pressurized volume limitation of aerosol sealant cans is entirely avoided. Additionally, the sealant fluid 18 maybe injected into a fully inflated tire (as a preventive measure), or into a nearly totally inflated tire with a slow leak therein.

Use of the device 10, driven by the pressurized air 36, does not discharge harmful aerosol products to the atmosphere, does not inject undesirable water into the interior of the tire, and efficiently forces all of the previously stored sealant liquid 18 into the tire.

The check valve structure 54 incorporated in the inlet fitting structure 32 also prevents the liquid "spray back" problems typically associated with aerosol sealant can devices. For example if the discharge connection member 74 (FIG. 6) is threaded onto the valve stem, and the left closure cap 82 is then removed, the valve ball 54 is moved leftwardly to its seated position on the valve seat 40 to prevent leftward discharge of the fluid 18 through the inlet opening 34 as might otherwise be caused by pressure within the tire. This check valve structure, of course, also prevents back flow of the fluid 18 into the pump 20 before it is energized. While the check valve structure 54 has been illustrated as being incorporated in the inlet fitting structure 32, it will readily be appreciated that, if desired, it could alternatively be incorporated in the discharge fitting structure 56.

While the illustrated device 10 is well suited to storing a tire sealant liquid, and later utilizing pressurized air to deliver the stored fluid to a tire interior, the device may also be used, as previously mentioned, to inject other tire treatment liquids, such as a tire conditioner liquid adapted to inhibit internal tire deterioration, into a tire. The device 10 is quite compact, is very easy to use, and may be inexpensively produced using readily available materials.

Figure 7:
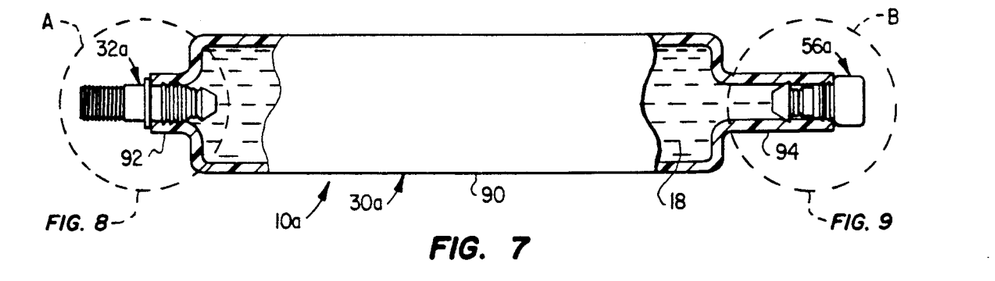
FIG. 7 is a partially sectioned side elevational view of an alternate embodiment of the device.
Figure 8:
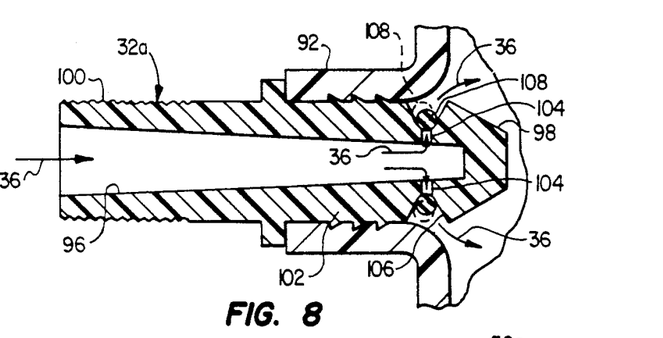
FIG. 8 is an enlargement of the circled area "A" in FIG. 7.
Figure 9:
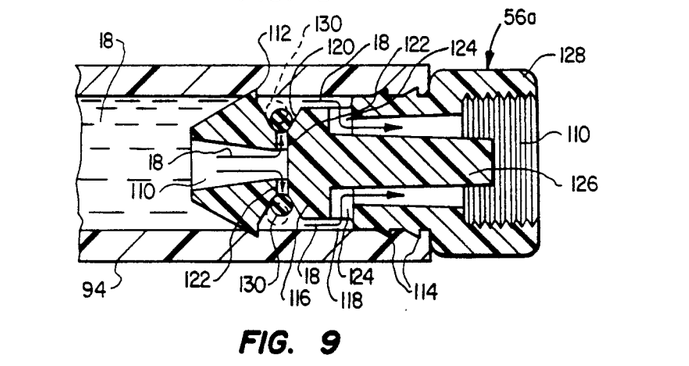
FIG. 9 is an enlargement of the circled area "B" in FIG. 7.

An alternate embodiment $10_a$ of the device 10 is illustrated in FIGS. 7-9 and includes a hollow liquid storage and transfer member $30_a$ having an elongated cylindrical body portion 90 which is substantially shorter and wider than the previously described tube 30 and has reduced diameter inlet and outlet end portions 92 and 94 which respectively receive an inlet fitting $32_a$ and an outlet fitting $56_a$. The storage and transfer member $30_a$ is filled with a tire sealant liquid 18 and is preferrably of a blow-molded plastic construction, while the inlet and outlet fittings $32_a$, $56_a$ are preferably plastic injection moldings.

Referring now to FIG. 8, the inlet fitting $32_a$ has an elongated, hollow cylindrical configuration, and an air inlet passage 96 extends rightwardly therethrough and terminates within a section 98 of the fitting disposed within the interior of the storage and transfer member $30_a$. For operative attachment to the air discharge hose connection fitting 24 (FIG. 3) a left end portion of the inlet fitting $32_a$ is externally threaded as at 100. As illustrated in FIG. 8, an externally barbed portion 102 of the fitting $32_a$ is received within and locked to the inlet end portion 92 of the storage and transfer member $30_a$. Adjacent its right end, the air inlet passage 96 opens outwardly, via ports 104, through an annular exterior surface recess 106 formed around the interior section 98 of the fitting $32_a$. For purposes later described, a resilient O-ring seal member 108 is coaxially received within the annular recess 106 and, in its normal solid line position, blocks the ports 104.

Referring now to FIG. 9, the outlet fitting $56_a$ has, along its length, a generally cylindrical cross-section through which a fluid outlet passage 110 extends between the left and right ends of the fitting $56_a$. As illustrated, a left longitudinal portion of the fitting $56_a$ is received within the outlet end portion 94 of the storage and transfer member $30_a$, and is provided with annular locking barbs 112 and 114. Between the barbs 112, 114 the fitting $56_a$ has a reduced diameter portion 116 which defines with the interior surface of the outlet end portion 94 an annular passage 118. Immediately to the right of the annular barb 112 an annular exterior surface recess 120 is formed on the fitting $56_a$.

The fluid outlet passage 110 extends inwardly through the left end of the fitting $56_a$ and extends outwardly through the surface of the annular recess 120 via ports 122. From the outer ends of the ports 122, the passage 110 extends rightwardly through the annular passage 118 and then back into the interior of the fitting $156_a$ via ports 124. From the inner ends of the ports 124, the passage 110 continues rightwardly through the fitting $156_a$, around an internal stem portion 126, into and rightwardly through an enlarged, internally threaded right end portion 128 of the fitting $56_a$. Right end portion 128 may be threaded onto the valve stem 12 of the tire 14 (FIG. 3) to cause the stem 126 to hold the tire valve in an open position. For purposes later described, a resilient O-ring seal member 130 is received in the annular recess 120 and (in its solid line position) normally covers the outer ends of the ports 122.

With the inlet fitting $32_a$ operatively connected to the air discharge hose connection fitting 24, and the right end portion 128 of the outlet fitting $56_a$ connected to the valve stem 12, pressurized air 36 is forced into the air inlet passage 96 and forces the O-ring seal 108 radially outwardly to its dotted line position (FIG. 8) thereby permitting pressurized air 36 to flow outwardly through the ports 104 and into the interior of the storage and transfer member $30_a$. The entry of pressurized air 36 into the interior of the storage and transfer member $30_a$ pressurizes the treatment liquid 18, thereby radially expanding the O-ring seal 130 to its dotted line position to uncover the outer ends of the ports 122. Pressurized liquid 18 is then sequentially flowed rightwardly through the annular passage 118, radially inwardly through the ports 124, and rightwardly through the balance of the outlet passage 110 into the interior of the tire via the valve stem 12. As previously described in conjunction with the device 10, after the entire charge volume of the treatment liquid 18 is flowed into the tire, a selected volume of pressurized air 36 may then also be flowed into the tire to inflate it.

The O-ring members 108 and 130, prior to the use of the device $110_a$, function as seal members to captively retain the charge volume of tire treatment liquid 18 within the liquid storage and transfer member $30_a$ until the device $10_a$ is to be used. These O-ring members also function as check valve means to essentially preclude reverse fluid flow (caused by tire pressure) through the device $10_a$. Specifically, it can be seen that a reverse fluid pressure, tending to flow fluid leftwardly through the storage and transfer member $30_a$ forces the O-ring members 108 and 130 radially inwardly against their associated flow ports to positively block both the air inlet passage 96 and the fluid outlet passage 110.

Figure 10:
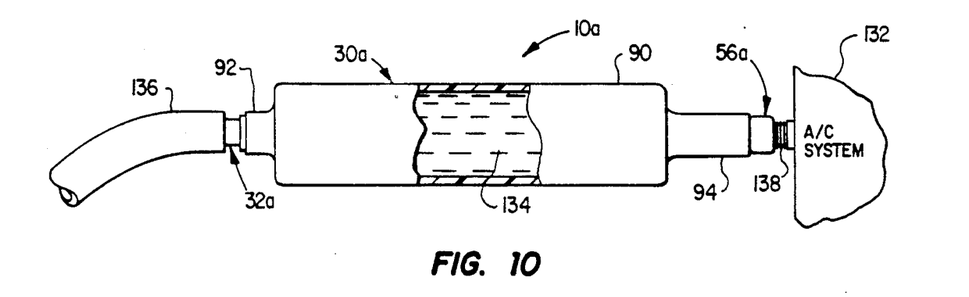
FIG. 10 is a partially sectioned side elevational view of a further alternate embodiment of the device being used to flow a treatment liquid, and pressurized refrigerant, into the refrigerant circuit of an automotive air conditioning system.

While the previously described devices 10 and $10_a$ are particularly useful for injecting a treatment liquid, and a subsequent volume of driving fluid, into the interior of a tire, they may also be advantageously utilized to inject other types of treatment liquid into other enclosed spaces. For example, as 10 illustrated in FIG. 10, the device $10_a$ may be utilized in conjunction with the refrigerant circuit of an automotive air conditioning system 132 simply by radially widening the inlet and outlet fittings $32_a$ and $56_a$, radially widening the inlet and outlet ends 92, 94 of the body $30_a$, and filling the storage and transfer member $30_a$ with a selected refrigerant circuit treatment liquid 134 such as a leak inhibiting liquid. The inlet fitting $32_a$ may then be connected to the supply hose 136 of a source of a pressurized refrigerant fluid, and the outlet fitting $56_a$ can be connected to the refrigerant fill valve 138 operatively communicating with the refrigerant circuit of the air conditioning system 132. The pressure of the refrigerant fluid in the supply hose 136 forces the treatment liquid 134 into the refrigerant circuit and, if desired, a subsequent volume of pressurized refrigerant may also be forced into the circuit. Accordingly, using the slightly modified device $10_a$, the refrigerant circuit may be partially or fully recharged in addition to forcing the treatment liquid 134 thereinto.

The foregoing detailed description is to be clearly understood as being given by way of illustration and example only, the spirit and scope of the present invention being limited solely by the appended claims.

What is claimed is:

1. Apparatus interconnectable between a source of pressurized gas and a normally closed inlet valve operative, when opened, to permit a flow of pressurized gas therethrough into an enclosed space with which the inlet valve is associated, said apparatus comprising:
    an elongate hollow liquid storage and transfer member filled with a charge volume of a treatment liquid to be injected into the interior space, said hollow liquid storage and transfer member having an inlet removably connectable to the source of pressurized gas, and an outlet spaced apart from the inlet by a portion of the transfer member containing the treatment liquid, said outlet being removably connectable to the inlet valve and operative to hold it open;
    check valve means incorporated into at least one of said inlet and outlets of said storage and transfer member for sealingly retaining the treatment liquid charge volume within said hollow storage and transfer member until said apparatus is to be used,
    said check valve means further being operative in one position to block pressure-driven reverse gas flow through said hollow liquid storage and transfer member during use of said apparatus; and
    said check valve means having a second position being operative, in response to respective connection of said inlet and outlets to the source of pressurized gas and the inlet valve, to permit pressurized gas to sequentially flow in one direction into said hollow liquid storage and transfer member, drive the treatment liquid charge volume into the enclosed space, and then flow into the enclosed space from within the interior of said hollow liquid storage and transfer member, said check valve means being returnable to said first position to prevent sprayback whenever the pressure at the outlet is greater than the pressure at the inlet.

2. The apparatus of claim 1 wherein:
    said means include resilient check valve members carried by said inlet and outlet portions.

3. The apparatus of claim 1 wherein:
    the source of pressurized fluid is a source of pressurized air,
    the enclosed space is the interior of a tire,
    the inlet valve is disposed within a valve stem mounted on the tire, and
    said treatment liquid is a tire treatment liquid.

4. The apparatus of claim 1 wherein:
    the source of pressurized fluid is a source of pressurized refrigerant fluid,
    the enclosed space is the interior of an air conditioning refrigerant circuit,
    the inlet valve is a refrigerant fill valve, and
    said treatment liquid is a refrigerant circuit treatment liquid.

5. The liquid storage and transfer device of claim 1 wherein:
    said check valve means are operatively associated with said inlet fitting means.

6. The liquid storage and transfer device of claim 5 wherein:
    said check valve means comprise cooperating valve ball and seat means positioned within said inlet fitting means.

7. The liquid storage and transfer device of claim 1 wherein:
    said elongate hollow liquid storage and transfer member is formed form a transparent material so that gas pressure-driven movement of treatment liquid outwardly therefrom into the enclosed space may be visually monitored.

8. The liquid storage and transfer device of claim 1 wherein:
    in at least one f said inlet and outlet portions of said storage and transfer member, said check valve means is resiliently deformable in moving from said one position to said second position.

9. The liquid storage and transfer device of claim 1 wherein:
    said check valve means comprises a ball member movable between a seat in said first position and a circular end wall in said second position.

10. Apparatus interconnectable between a source of pressurized fluid and a normally closed inlet valve operative, when opened, to permit a flow of pressurized fluid therethrough into an enclosed space with which the inlet valve is associated, said apparatus comprising:

a hollow liquid storage and transfer member filled with a charge volume of a treatment liquid to be injected into the interior space, said hollow liquid storage and transfer member having an inlet portion removably connectable to the source of pressurized fluid, and an outlet portion removably connectable to the inlet valve and operative to hold it open;

means associated with said inlet and outlet portions for sealingly retaining the treatment liquid charge volume within said hollow storage and transfer member until said apparatus is to be used, wherein:

said means include resilient check valve members comprising O-ring seal members carried by said inlet and outlet portions;

said means being operative, in response to respective connection of said inlet and outlet portions to the source of pressurized fluid and the inlet valve, to permit pressurized fluid to sequentially flow into said hollow liquid storage and transfer member, drive the treatment liquid charge volume into the enclosed space, and then flow into the enclosed space from within the interior of said hollow liquid storage and storage member, and said means further being operative to inhibit pressure-driven reverse fluid flow through said hollow liquid storage and transfer member during use of said apparatus.

11. The apparatus of claim 10 wherein:

said hollow liquid storage and transfer member is formed from a blow-molded plastic material and has a generally cylindrical body portion with reduced diameter inlet and outlet ends, and said inlet and outlet fittings are plastic injection moldings respectively received and locked within said inlet and outlet ends.

12. Apparatus interconnectable between a source of pressurized fluid and a normally closed inlet valve operative, when opened, to permit a flow of pressurized fluid therethrough into an enclosed space with which the inlet valve is associated, said apparatus comprising:

a hollow liquid storage and transfer member filled with a charge volume of a treatment liquid to be inject into the interior space, said hollow liquid storage and transfer member having an inlet portion removably connectable to the source of pressurized fluid, and an outlet portion removably connectable to the inlet valve and operative to hold it open; and means associated with said inlet and outlet portions for sealingly retaining the treatment liquid charge volume within said hollow storage and transfer member until said apparatus is to be used, said means including;

said inlet portion having an inlet fitting having a section disposed within the interior of said hollow liquid storage and transfer member, said inlet fitting section having a first annular exterior surface recess through which a fluid inlet passage outwardly opens, said outlet portion having an outlet fitting having a section disposed within the interior of said hollow liquid storage and transfer member, said outlet fitting section having a section annular exterior surface recess through which a fluid outlet passage outwardly opens, and O-ring seal members coaxially carried within said first and second annular recesses and resiliently blocking said fluid inlet and outlet passages;

said means being operative, in response to respective connection of said inlet and outlet portions to the source of pressurized fluid and the inlet valve, to permit pressurized fluid to sequentially flow into said hollow liquid storage and transfer member, drive the treatment liquid charge volume into the enclosed space, and then flow into the enclosed space from within the interior of said hollow liquid storage and storage member, said means further being operative to inhibit pressure-driven reverse flow through said hollow liquid storage and transfer member during use of said apparatus.

* * * * *

UNITED STATES PATENT AND TRADEMARK OFFICE
CERTIFICATE OF CORRECTION

PATENT NO. : 5,070,917
DATED : December 10, 1991
INVENTOR(S) : Ferris, et al.

It is certified that error appears in the above-identified patent and that said Letters Patent is hereby corrected as shown below:

In column 8, line 42, delete "156a" and add --56a--.

In column 9, line 25, delete the number "10" after the words "For example, as".

In column 10, line 51, delete the word "form" and add the word --from--.

In column 10, line 57, delete "f" and add the word --of--.

In column 12, line 5, delete the word "inject" and add the word --injected--.

In column 12, line 25, delete the word "section" after the words "fitting section having a" and add the word --second--.

UNITED STATES PATENT AND TRADEMARK OFFICE
CERTIFICATE OF CORRECTION

PATENT NO. : 5,070,917
DATED : December 10, 1991
INVENTOR(S) : Ferris, et al.

It is certified that error appears in the above-identified patent and that said Letters Patent is hereby corrected as shown below:

In column 8, line 44, delete "156a" and add --56a--.

Signed and Sealed this

First Day of June, 1993

Attest:

MICHAEL K. KIRK

*Attesting Officer*   Acting Commissioner of Patents and Trademarks